United States Patent Office 3,562,176
Patented Feb. 9, 1971

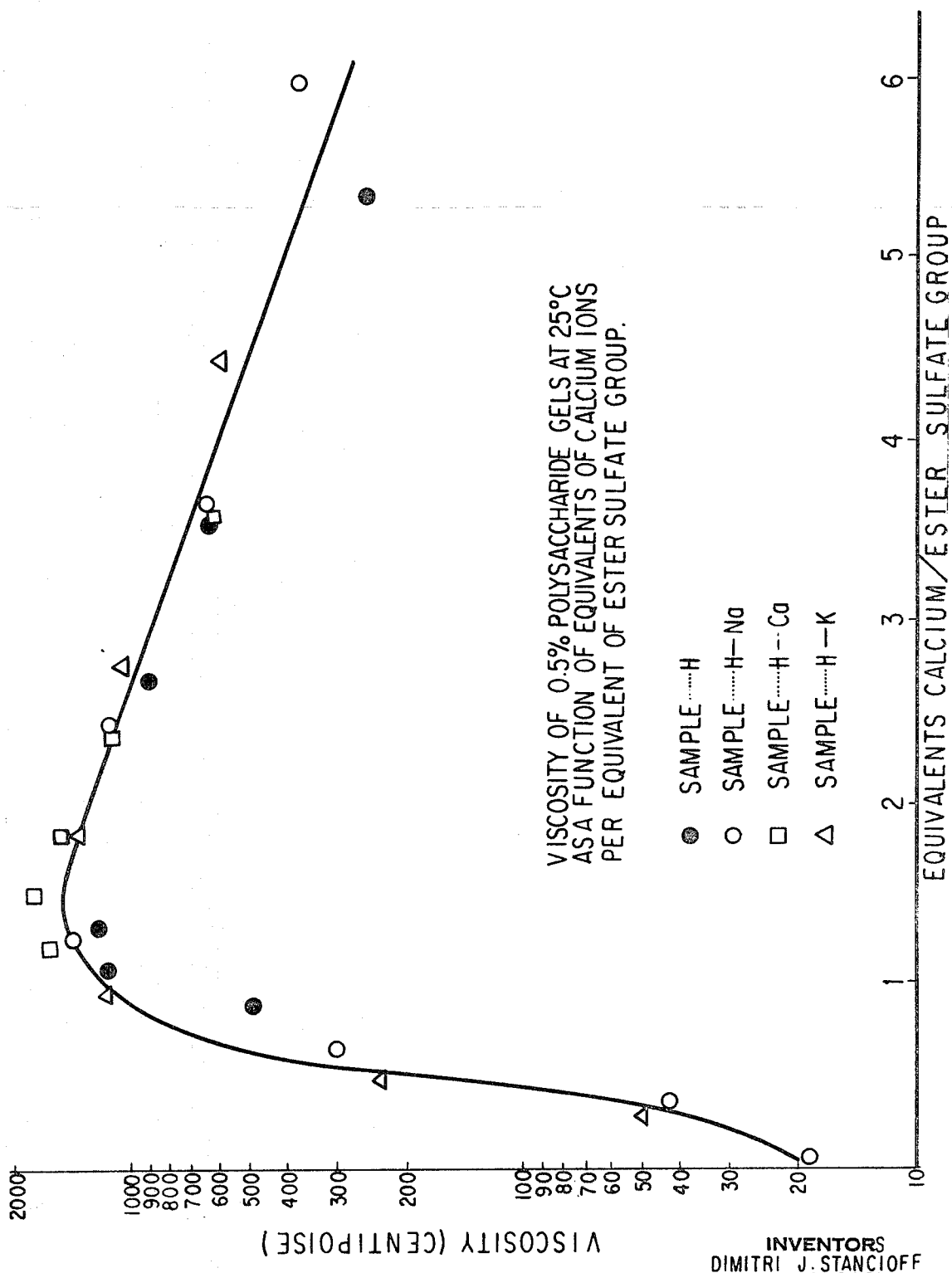

3,562,176
PRODUCTION OF THIXOTROPIC GELS AND
COMPOSITION THEREFOR
Dimitri J. Stancioff, Camden, and Richard G. Cash and John Blethen, Rockland, Maine, assignors to Marine Colloids, Inc., Springfield, N.J., a corporation of Delaware
Filed Nov. 28, 1967, Ser. No. 686,115
Int. Cl. B01j 13/00; A01n 17/10; C08k 17/12
U.S. Cl. 252—316
11 Claims

ABSTRACT OF THE DISCLOSURE

A composition and a method are provided for making an aqueous thixotropic gel reproducibly to substantially optimum predetermined characteristics of static viscosity and thixotropy. The composition consists essentially of (1) a polysaccharide extracted from a marine plant, which polysaccharide contains sulfate groups, (2) a water-soluble compound of sodium or potassium which is a sequestrant for calcium, and (3) a water-soluble compound of calcium which dissolves in water and releases calcium ions at a substantially slower rate than that at which the sequestrant dissolves. The thixotropic gel is useful as a vehicle for dispersed substances.

BACKGROUND OF THE INVENTION

This invention relates to aqueous thixotropic gels and to the employment of such gels as a vehicle for dispersed substances. This invention relates more especially to the production of thixotropic gels utilizing a polysaccharide obtained by extraction from a marine plant and to compositions containing such a polysaccharide which upon addition to water may be employed to produce a thixotropic gel.

It has been known for many years that marine plants contain hydrocolloid material which is recoverable therefrom by extraction. The recovered hydrocolloid generally speaking is notable for its capacity in water-soluble or water-swelled forms to exercise a very pronounced effect even in small amounts on the physical properties of water in which the extract is dispersed. In the usual case the extract is effective in small amounts to effect a very great increase in viscosity and in a suitable environment the extract when in dilute aqueous solution may induce gelation. The properties of extractives obtained from different marine plants differ widely under given environmental conditions.

Certain red seaweeds of the order Gigartinales and notably those of the Solieriaceae and Phillophoraceae families have been known to contain a hydrocolloid in the form of a sulfated polysaccharide that is characterized by glycosidically linked hexose sugar groups, the sulfate groups being associated with the hexose units as a half ester. Such polysaccharide extracts when dispersed in water are influenced by the character of cations associated therewith. In the naturally occurring state the princinpal cations that are associated with the sulfate groups are sodium, potassium and calcium. However, in the recovered product the cations associated with the polysaccharide are affected by the environment that is employed in extracting the polysaccharide from the seaweed. For example, if the extraction is assisted by the employment of sodium carbonate the proportion of sodium cations is increased while if the extraction of the polysaccharide is carried out utilizing a lime treatment at elevated temperature as in U.S. Pat. No. 3,094,517, the proportion of calcium cations associated with the sulfate groups becomes increased. Generally speaking, the influence of sodium cations is in the direction of enhanced solubility. Potassium cations in some instances exercise a pronounced gelling effect but not in others. The influence of calcium cations generally is in the direction of decreased solubility or a gelling effect, but certain polysaccharides are relatively insensitive to the presence of calcium cations.

Extracts obtained from marine plants have been used as suspending agents. Thus such extracts are widely used for suspending cocoa particles in chocolate milk drinks. Extracts from marine plants also have been used as suspending agents for a variety of dispersed substances in preparations having industrial uses.

SUMMARY OF THE INVENTION

Certain of the aforesaid polysaccharides that are characterized by sulfated glycosidically linked hexose sugar units when in the presence of the proper amount of calcium cations under conditions to be described hereinafter have the capacity to form a gel possessing in high degree the properties of thixotropy, namely, exhibiting the consistency of a gel when in repose but becoming readily flowable responsive to mechanically applied force which imparts shear.

The polysaccharides which have been found to possess this property are composed essentially of glycosidically linked hexose sugar units in the form of D-galactose and 3,6-anhydro-D-galactose residues and are further distinguished by exhibiting in the infrared spectrum thereof a strong absorption peak at 805–810 reciprocal centimeters as well as the absorption peak at 845–850 reciprocal centimeters exhibited by common varieties of carrageenan such as that extracted from *Chondrus crispus*. Thus the preferred polysaccharides which exhibit properties suitable for the practice of this invention are polysaccharides wherein the ratio of the absorption peak at 805–810 reciprocal centimeters relative to the absorption peak at 845–850 reciprocal centimeters is from 0.50 to 0.90, although the value of this ratio may range from 0.4 to 1.0. The average number of ester sulfate groups as determined by conventional analytical procedures in relation to hexose sugar units is high, namely, about 75% to about 125% of the number of hexose sugar units.

The usual sources of the polysaccharide that is employed in the practice of this invention are as follows:

Genus and species:
  *Eucheuma spinosum (muricatum)*
  *Eucheuma isiforme*
  *Eucheuma uncinatum*
  *Eucheuma serra*
  *Eucheuma gelidium*
  Eucheuma (not determined)
  Sarconema (not determined)
  *Agardhiella tenera*
  *Agardhiella coulterii*
  *Gymnogongrus norvegicus*
  *Gymnogongrus furcellatus*
  *Ahnfeltia durvillaei*

The foregoing is not an exhaustive list of all seaweeds which yield the desired polysaccharide but only a list of the most readily available types.

The hexose composition of the polysaccharide varies somewhat depending on the type of seaweed from which the polysaccharide is obtained and on the processing conditions employed in its recovery from the seaweed. Extraction with lime generally enhances gelling properties and also tends to minimize variation as between different lots of weed. Such extraction of the polysaccharide is, therefore, normally to be preferred. However, lime extraction is not essential. Thus extraction in the presence of other alkalis or even using plain water is adequate, particularly when the polysaccharide is employed at higher concentration levels. Generally the ratio of D-galactose residues to 3,6-anhydro-D-galactose residues as determined by conventional analytical procedures is from about 2:1 to about 1:1. The molecular weight of the polysaccharide may vary from about 20,000 to 1,000,000.

For purposes of brevity, the polysaccharide that is employed according to this invention will be referred to hereinafter as the "aforesaid" polysaccharide.

The aforesaid polysaccharide is similar to other hydrocolloids derived from marine plants in that in its natural state most of the cations that are associated with it are sodium, potassium and calcium and in that if the polysaccharide is processed or treated so that substantially all of the cations are sodium cations, the polysaccharide when dispersed in water in the solid state swells rapidly and then goes into solution to form a clear, homogeneous viscous sol, the rate of solution being increased with increase in temperature. The sol so produced does not possess the property of thixotropy.

When the aforesaid hydrocolloid is caused to occur so as to be substantially entirely in the form of the calcium salt, namely, so that substantially all of the cations associated therewith are calcium cations, and the polysaccharide in the form of solid particles is dispersed in water at ordinary room temperature, e.g. 25° C., the particles will swell gradually until they will have imbibed water to the extent of approximately 50 to 200 times their dry weight. However, they do not continue to imbibe further water and retain their particulate state, any excess water remaining being practically devoid of the polysaccharide. In this condition the swollen particles do not provide a thixotropic gel.

If the hydrated particles in the presence of excess water are subjected to intense mechanical action, as by use of a high speed blender such as a Waring Blendor, which subjects the particles to high shear, the particles may be induced to become more highly hydrated until the particles begin to lose their characteristics as discrete entities and the aqueous dispersion acquires the property of a thixotropic gel. However, for use as a vehicle for the production of useful suspensions it is impractical to prepare a thixotropic gel in this way partly because of the unavailability of and expense for high shear stirring equipment and partly because of the difficulties encountered in attempting to obtain reproducible results.

Instead of subjecting polysaccharide in the form of its calcium salt to high shear at or about atmospheric temperature, further hydration of the polysaccharide particles may be induced by heating the aqueous dispersion thereof to a temperature of the order of 70° to 80° C. at which the particles appear to become fully hydrated and form a clear, homogeneous sol which upon cooling to ordinary room temperature, e.g. 25° C., without stirring sets to a solid, elastic gel that exhibits a higher yield point and at the same time better shear thinning properties as compared with the gel produced at atmospheric temperature under the influence of intense mechanical shearing action. A thioxotropic gel of comparable properties also can be produced, but without the necessity for heating, by first dissolving the polysaccharide in the form of its sodium salt at ordinary room temperature and then adding calcium cations until the polysaccharide becomes converted to the calcium salt. While by trial and error a high-grade thixotropic gel can be obtained in either of these ways, nevertheless it is almost impossible to produce such a gel to uniform predetermined specifications on a repetitive basis due to variations in the polysaccharide as regards cation content and as regards the size and density of the particles thereof and due to variations in the mineral content of the water that is used, and variations in the manner and temperature of mixing, etc. While lack of uniformity can be alleviated to a certain extent by control of cation content, as by preliminary cation exchange using a sequestrant or an ion exchange resin, and by control of particle size and density and control of other variables, such controls are inconvenient and their successful application is difficult to realize in practice.

Notwithstanding the variables which present difficulties in obtaining thixotropic gels approaching optimum properties on a reproducible basis, these difficulties have been successfully overcome, according to this invention, in the following manner.

While the polysaccharide must meet the requirements hereinabove stated, nevertheless within the area of these requirements the polysaccharide that is employed may vary considerably between different lots as regards its cation content and as regards particle size and density and still obtain gel uniformity and optimum gel properties. Thus the polysaccharide may be in the form ordinarily recovered, namely, it may contain sodium, potassium and calcium cations in varying relative proportions, although it ordinarily is desirable to know in a general way the approximate calcium content. There is employed with the polysaccharide an ionizable calcium compound which releases calcium cations for converting the polysaccharide to the calcium salt form and there likewise is present a water-soluble sequestrant for calcium whose rate of solubility is substantially greater than the rate of solubility of the calcium compound.

The sequestrant is a compound of an alkali metal selected from the group consisting of sodium and potassium and is employed in an amount that is at least the equivalent of the calcium contained in the polysaccharide whereby any calcium cations associated with the polysaccharide may be replaced with sodium and/or potassium from the sequestrant. In the usual case the amount of calcium released from the calcium compound during the period when the sequestrant becomes dissolved is small and interferes only slightly with the solution of the polysaccharide. However, it is generally preferable to provide a slight excess of sequestrant of at least 0.2 equivalent per equivalent of sulfate groups in the polysaccharide in order to insure complete solution thereof. The upper limit for the sequestrant is not critical except in relation to the quantity of the calcium compound that also is present. Thus in normal practice of this invention an amount of sequestrant is employed which is substantially in excess of the aforesaid minimum with the result that notwithstanding variations in the polysaccharide, one of the essentials to the attainment of optimum gel characteristics is realized, namely, the preliminary or initial occurrence of the polysaccharide in the completely dissolved state.

The quantity of the soluble calcium compound that is present is such that the sum of the calcium in said calcium compound plus the calcium from the polysaccharide is the sum of the stoichiometric equivalent of the sequestrant plus about 0.3 to about 4 equivalents per equivalent of sulfate groups contained in the polysaccharide. If after the sequestrant has become exhausted there is at least 0.3 equivalent of calcium per equivalent of the sulfate groups of the polysaccharide this insures sufficient calcium for the development of nearly optimum thixotropic gel characteristics. A further increase in the calcium up to 1 equivalent per equivalent of sulfate groups in the polysaccharide affords a slight further improvement in the thixotropic gel system. When the calcium is increased so as to be greater than about 4 equivalents per equivalent of sulfate groups in the polysaccharide the calcium has an undesirable dehydrating effect on the polysaccharide. It is apparent that this range within which the quantity of calcium compound may be varied while still obtaining nearly optimum gel properties permits substantial self-adjustment to varying conditions.

More generally, the system is such that there is no upper limit for the amount of sequestrant or for the amount of calcium compound that is employed so long as the amount of calcium cations that are present when the system reaches equilibrium is within the range aforesaid.

Any sequestrant for calcium that reduces the activity of the cations in solution may be employed. In the preparation of a thixotropic gel as a suspending agent the sequestrant preferably is such as to become dissolved in 2 or 3 minutes when added to water at about 25° C. It is desirable that the sequestrant become dissolved promptly so as to minimize the amount of calcium that becomes released from the calcium compound and that has to be taken up by the sequestering agent before the sequestering agent becomes exhausted. However, it is the relative rates of solubility that is important when using the composition of this invention and at higher levels the sequestrant may require as long as about 30 minutes to become dissolved. In order to promote the rapid solubility of the sequestrant it preferably is ground so as to pass a 40-mesh standard testing sieve, or finer.

Preferred sequestrants are illustrated by trisodium phosphate dodecahydrate ($Na_3PO_4 \cdot 12H_2O$) and hexametaphosphate ($NaPO_3)_6$. However, there are many others that may be used such as sodium carbonate, sodium bicarbonate, sodium acid phosphate, complex sodium phosphates, polyphosphate glasses, orthophosphate, sodium silicate, sodium calcium silicate, sodium fluoride, sodium citrate, sodium oxalate, sodium zeolites and ion exchange resins. While the alkali metal content of the sequestrant ordinarily is sodium, it also may be potassium.

Any ionizable calcium compound may be employed so long as, when in the condition in which it is provided, it releases cations sufficiently slowly so that the sequestrant may become dissolved and then becomes exhausted while sufficient undissolved calcium still remains for converting the dissolved polysaccharide from the soluble alkali metal salt form to a thixotropic gel wherein the sulfate groups are associated with calcium rather than sodium or potassium, namely, calcium in the quantity hereinabove defined. Preferably the rate at which the calcium goes into about ½ to about ⅟₅₀ the rate sol solution of the sequestrant becomes dissolved under the mixing conditions that are employed. While the differential in rates of solution may vary considerably, nevertheless for practical reasons the rate of solution of the calcium compound should be about ½ to about ⅟₅₀ the rate of solution of the sequestrant.

The preferred calcium compounds are calcium sulfate dihydrate ($CaSO_4 \cdot 2H_2O$), calcium borate ($Ca(BO_2)_2 \cdot 2H_2O$), and calcium tetraborate ($CaB_4O_7 \cdot 6H_2O$). These calcium compounds without any treatment are slightly soluble and dissolve slowly so as to provide a controlled rate of gradual calcium release. Other suitable inorganic calcium compounds are calcium sulfate hemihydrate and calcium metaborate. Organic calcium compounds also may be employed such as calcium malate, calcium dimalate, calcium lactate. If the calcium compound dissolves too rapidly, e.g. calcium oxide or calcium chloride, the release of calcium therefrom can be controlled by coating the particles thereof with a water-resistant or water-insoluble film such as glyceryl monostearate, calcium oleate, insoluble wax, fat, gum or even some other salt. If the protective film is water-insoluble it may provide its control function on the release of calcium by becoming gradually abraded. If it is water-resistant, it may function similarly or may effect the desired control by gradual dissolution. The rate of solution of the calcium compound can be further controlled by selection of its mesh size, the rate of solution being decreased by the selection of coarser particles. In any case, when reference is made herein to the quantity of calcium compound that is present, the reference is to calcium compound that is soluble in the water to provide free calcium cations capable of reaction with the sequestrant or with the sulfate groups of the polysaccharide, or both. Any calcium that is in the insoluble state as initially employed or that is otherwise in the insoluble state either as the result of chemical reaction or due to an unremoved superficial insoluble physical coating is not to be considered as calcium contained in a water-soluble compound of calcium.

By the selection, according to this invention, of the proper components in the proper relative proportions a composition is afforded which enables one to produce and uniformly reproduce to predetermined optimum specifications gels having highly desirable thixotropic properties. Moreover, the composition may be proportioned so as to be self-adjusting to different conditions as regards different lots and variables of marine plants, different calcium contents, different grain sizes, different particle sizes, different degrees of water hardness, different degrees of water temperature, different mixing conditions, etc.

All that is required to produce a thixotropic gel in the practice of this invention is to add the composition to water with moderate stirring, either by hand or mechanically, for a few minutes until the polysaccharide and the sequestrant become dissolved and then continue for a few minutes more until the resulting solution becomes thickened in response to liberation of calcium cations after the sequestrant becomes exhausted. Being highly thixotropic, the gel can continue to be stirred and upon discontinuing the stirring it will set up to form a gel that can hold particles suspended therein indefinitely.

The amount of water that is added to the solid composition may be varied depending on the inherent gel strength of the polysaccharide and upon desired resistance to rupture of the gel that is produced. Adequate gel strength for most purposes is afforded when the concentration of the polysaccharide is of the order of 0.3% to about 1%. However, depending on the contemplated usage, the concentration of the polysaccharide in the aqueous gel may vary from about 0.05% to about 4.0%.

The gel may be produced over a wide range of pH, namely, from about 5 to about 13. For most purposes, however, the pH is on the alkaline side.

Thixotropic gels that have been produced as hereinabove described have excellent properties as a suspending agent and may be employed as a vehicle for any substance that one may wish to disperse therein. The gel when in repose assumes the consistency of a weak gelatinous solid which resists flow until a shearing stress is imposed which exceeds the yield value of the gel. When this yield value is exceeded the gel becomes of a thin, flowable consistency which is augmented responsive to increasing the vigor or duration of applied shearing force. So long as particles are small enough so that the shearing force they exert on the gel does not exceed the yield value of the gel the particles will remain suspended indefinitely. However, the gel also has the property of becoming thin responsive to mechanical shear and it may be pumped or sprayed through an orifice or spread on a roller, coated on a grinding lap or used in whatever other way may be desired. For example, when a thixotropic gel is employed as a suspended medium for abrasive alumina particles used for grinding glass or lenses, the gel becomes very fluid and does not interfere with the abrasive action. But it also is the case that the suspended particles remain uniformly distributed and as soon as the mechanical stresses imposed thereon are discontinued the vehicle resumes its gel consistency whereby the particles are held in suspension.

Other abrasive particles also may be held in suspension such as silicon carbide, boron carbide, diamond dust, etc. The suspended material may be solid or liquid and may be inorganic such as metals or metal oxides or pigments, or may be organic such as insecticides, fungicides, herbicides, fertilizers, etc. Moreover, the dispersed material may be in solution, for the thixotropic properties of the gel are such that it is excellently adapted for use wherever resistance to flow after application is desired. For example, the thixotropic gel may be employed as a vehicle for a dye applied to a surface or for an insecticide applied to foliage.

DESCRIPTION OF PREFERRED EMBODIMENTS

Further features, purposes and advantages of this invention will be apparent from the following description of certain examples which are illustrative of the practice thereof.

The general method for preparing the suspensions described in the examples was as follows:

40 grams of aluminum oxide abrasive powder with a particle size of 95 to 175 microns were blended with various amounts of polysaccharide, sequestrant, and slowly soluble calcium compound, all ground to pass a 100-mesh screen.

This blend was poured into a tall form of 400 ml. Berzelius beaker containing 160 grams of tap water at 25° C. The mixture was stirred with a 1″ four-bladed turbine type agitator pitched to 25°–30° and revolving at sufficient speed to make a small vortex in the beaker. After 7 minutes the agitator was removed and the mixture poured into a 250 ml. beaker for observation and viscosity measurements. Viscosity was measured at 25° C. after 24 hours unless otherwise stated. Immediately before making a viscosity reading the mixture was stirred for 1 minute. Viscosity was measured with a Brookfield LVT viscometer at 60 r.p.m. and unless otherwise stated either a #2 or a #3 cylindrical spindle was used, the #2 spindle being employed in the case of mixtures of lower viscosity and the #3 spindle being employed in the case of mixtures of higher viscosity at which a more accurate reading can be obtained with the #3 spindle. Thixotropic breakdown of the gel structure was measured at 25° C. after standing for 24 hours with a Brookfield LVT instrument equipped with the Brookfield Helipath and a 1$\frac{7}{16}$″ crossbar type spindle. With this instrument two measurements of the gel system are made. First, as the Helipath drives the spindle downward through the gel in a helical path constantly cutting through new undisturbed material to get a high reading. Then when the downward movement is stopped and the spindle revolves in the same place for several revolutions a low reading is obtained. The difference between the two readings is a measure of the thixotropy of the system, the greater the difference the greater the thixotropic breakdown. With non-thixotropic systems both readings are essentially the same.

varied somewhat as regards cation content and the size and density of the particles.

As the sequestrant, technical grade trisodium phosphate dodecahydrate containing 52.7% of water of hydration was used at the level of 0.2 gram, namely, at a level of about 0.9 equivalent per equivalent of the sulfate groups of the polysaccharide of Sample A and about 0.9 equivalent per equivalent of the sulfate groups of the polysaccharide of Sample G. This amount is the equivalent of the calcium content of Sample A. In the case of Sample G it is the equivalent of the calcium content plus an excess of 0.2 equivalent of sequestrant per equivalent of sulfate groups in Sample G.

The calcium sulfate dihydrate was used at the level of 0.2 gram and at the level of 0.4 gram. The 0.2 gram level of calcium sulfate dihydrate plus the calcium from the polysaccharide provided calcium in an amount corresponding with the equivalent of the sequestrant plus about 1.2 equivalent per equivalent of the sulfate groups of the polysaccharide in the case of Sample A and about 1.0 equivalent per equivalent of the sulfate groups in the case of Sample G. In each case at equilibrium the calcium was more than sufficient to convert the polysaccharide to the gelled state but insufficient to interfere with optimum hydration of the polysaccharide. At the level of 0.4 gram the calcium sulfate dihydrate plus the calcium from the polysaccharide likewise was less than the aforesaid maximum of 4 equivalents per equivalent of the sulfate groups of the polysaccharide plus equivalency with the sequestrant.

The pattern was similar in the case of Samples B through F in that there was a comfortable excess of both sequestrant and calcium sulfate for permitting self-adjustment to variations in the polysaccharide.

The formulae in tabular form were as follows:

|  | Formulae | | |
|---|---|---|---|
|  | I, gram | II, gram | III, gram |
| Polysaccharide | 0.6 | 0.6 | 0.6 |
| Na$_3$PO$_4$.12H$_2$O |  | 0.2 | 0.2 |
| CaSO$_4$.2H$_2$O |  | 0.2 | 0.4 |

Viscosity values in centipoises were determined as aforesaid. The character of the suspension was noted by visual inspection. The results appear in Table I which follows:

TABLE I

[Comparison of viscosity and suspending properties of suspensions prepared with and without sequestrant and slow release of calcium compound.]

| Centipoise | | A | B | C | D | E | F | G |
|---|---|---|---|---|---|---|---|---|
| Sample: | | | | | | | | |
| Formula I | Viscosity suspension | ¹ 66 | ¹ 113 | ² 127 | ² 36 | ² 135 | ² 87 | ² 138 |
| Formula II | do | ³ 344 | ³ 315 | ³ 262 | ³ 266 | ³ 264 | ³ 294 | ³ 261 |
| Formula III | do | ³ 522 | | | | | | ³ 544 |

¹ Settled.
² Streaky.
³ Perfect.

Example 1

Suspensions were prepared utilizing seven typical samples of the polysaccharide that is employed according to this invention, the samples being identified as Samples A through G. Each of the polysaccharides was employed at a level of 0.6 gram per 160 grams of water, namely, at a concentration of substantially 0.37%. The calcium content of Sample A was about 0.9 equivalent per equivalent of the sulfate groups therein. Sample A was an extract produced from the seaweed species *Eucheuma spinosum* by aqueous extraction at a pH of 11–12. The calcium content of Sample G was about 0.70 equivalent per equivalent of the sulfate groups therein. Sample G was an extract produced from the seawood species *Eucheuma spinosum* by aqueous extraction with lime. The calcium contents of Samples B through F were of a generally similar order as compared with Samples A and G but The data in Table I shows that in the absence of the combination of the sequestrant and the compound that slowly releases calcium cations the viscosities generally were low and likewise were very irregular and that the abrasive particles either settled completely or settled partially, as indicated by streaking. Formulae II and III show that when employing the compositions of the invention the viscosities were much higher and more uniform and that in each instance the suspension of the abrasive particles was perfect. The higher viscosities in connection with Formula III indicate better use of the suspending potential of the polysaccharide. It is to be noted that viscosity readings correlated well with the ability of the system to suspend the abrasive particles.

Example 2

Suspensions were prepared in the manner above described utilizing thte polysaccharide of Samples A and

Example 5

A suspension was prepared with 0.5 gram of the polysaccharide of Sample A, 0.168 gram of sodium carbonate and 0.2 gram calcium sulfate dihydrate. The sodium carbonate was the equivalent of the calcium contained in the polysaccharide plus 1.1 equivalents per equivalent of the sulfate groups of the polysaccharide. The calcium sulfate dihydrate plus the calcium from the polysaccharide was the equivalent of the sodium carbonate plus 0.4 equivalent per equivalent of the sulfate groups of the polysaccharide. The suspension held up very well in the presence of the combined additives whereas the control sample in the absence of the additives settled in a few minutes.

Example 6

A suspension was prepared with 0.5 gram of the polysaccharide of Sample A in combination with 0.2 gram of sodium hexametaphosphate and 0.3 gram of calcium sulfate dihydrate. The 0.2 gram of sodium hexametaphosphate was the equivalent of the calcium cations contained in the polysaccharide plus 0.3 equivalent per equivalent of the sulfate groups in the polysaccharide. The 0.2 gram of calcium sulfate dihydrate was the equivalent of the sodium hexametaphosphate plus 2.3 equivalents per equivalent of the sulfate groups of the polysaccharide. The composition suspended perfectly and after standing for 24 hours the viscosity was 259 centipoises. A control sample containing a like concentration of the polysaccharide settled in only a few minutes and had a viscosity of only 66 centipoises.

Example 7

A series of suspensions was made with polysaccharide Sample A and another series was made with Sample G using various amounts of trisodium phosphate dodecahydrate and calcium sulfate dihydrate. These series were made in order to show the relationship between sequestrant and the slowly soluble calcium compound. Viscosities were measured after 2 hours and after 24 hours.

TABLE V

[Viscosity (cps.) of suspensions made with various amounts of trisodium phosphate dodecahydrate and calcium sulfate dihydrate and 0.6 gram of polysaccharide Sample A.]

| $Na_3PO_4 \cdot 12H_2O$, (grams) | $CaSO_4 \cdot 2H_2O$, grams | | | | | | |
|---|---|---|---|---|---|---|---|
| | 0 | 0.2 | 0.4 | 0.6 | 0.8 | 1.0 | 1.2 |
| 0 | 57S | | | | | | |
| 0.1 | 61S | 170F | | 46S | | 41S | |
| 0.2 | | 344P | 522P | | 338P | | 279P |
| 0.3 | | 56S | | 600P | | 476P | |
| 0.4 | | | 265D | | 504P | | 502P |
| 0.5 | | | | 392D | | 460P | |
| 0.6 | | | 10S | | 370D | | 458P |
| 0.7 | | | | 10S | | 414D | |
| 0.8 | | | | | 13S | | 384D |

NOTE.—Viscosities in centipoises:
S=Suspension settled.
F=Fair suspension.
P=Perfect suspension.
D=Perfect suspension but delayed. Took more than 2 hours to reach maximum viscosity.

TABLE VI

[Viscosity (cps.) of suspensions made with various amounts of trisodium phosphate dodecahydrate and calcium sulfate dihydrate and 0.6 gram of polysaccharide Sample G.]

| $Na_3PO_4 \cdot 12H_2O$, grams | $CaSO_4 \cdot 2H_2O$, grams | | | | | | |
|---|---|---|---|---|---|---|---|
| | 0 | 0.2 | 0.4 | 0.6 | 0.8 | 1.0 | 1.2 |
| 0 | 101S | | | | | | |
| 0.1 | 19S | 580P | | 260P | | 123F | |
| 0.2 | | 261P | 544P | | 452P | | 318P |
| 0.3 | | 50S | | 500P | | 466P | |
| 0.4 | | | 251D | | 423P | | 462P |
| 0.5 | | | | 346D | | 339P | |
| 0.6 | | | | | 382D | | 414D |
| 0.7 | | | | 15S | | 394D | |
| 0.8 | | | | | 19S | | 212D |

NOTE.—Same as Table V.

The data appearing in Tables V and VI illustrate the use of different relative proportions of the sequestrant and of the calcium compound whereby the advantages of this invention are attained and also illustrate the scope of the zone of tolerance within which excellent thixotropic gels may be produced. If the calcium is too high (upper right in the tables) the polysaccharide does not dissolve completely. Thus, having reference to Table V, one of the suspensions was prepared using 0.6 gram of the polysaccharide of Sample A, 0.1 gram of trisodium phosphate dodecahydrate and 1.0 gram of calcium sulfate dihydrate. The 0.1 gram of trisodium phosphate was less than the equivalent of the calcium contained in the polysaccharide and therefore complete solution of the polysaccharide was not obtained. Furthermore, the 1.0 gram of the calcium sulfate dihydrate plus the calcium from the polysaccharide was the equivalent of the trisodium phosphate dodecahydrate plus 5.5 equivalents per equivalent of the sulfate groups of the polysaccharide. This excess of calcium over that required to exhaust the trisodium phosphate dodecahydrate interfered with the proper hydration of the polysaccharide.

On the other hand, if the level of the sequestrant is too high (lower left of the tables) there is not enough calcium left after exhausting the sequestrant for a gel to form and settling occurs. Thus with reference to Table V, settling occurred in the case of the formulation containing 0.6 gram of the polysaccharide of Sample A, 0.8 gram of trisodium phosphate dodecahydrate and 0.8 gram of calcium sulfate dihydrate. In this formulation the amount of free calcium was insufficient to provide a gel that prevents settling due, it is believed, to the formation under these conditions of some insoluble tricalcium phosphate which interferes with the full liberation of the calcium in the calcium sulfate dihydrate so that it may occur in the free form for reaction with the sulfate groups G of Example 1 at the level of 1.0 gram, namely, at a concentration of about 0.6%. Trisodium phosphate dodecahydrate was employed therewith as the sequestrant at levels of 0.3 gram and 0.6 gram. At 0.3 gram the amount of sequestrant was such as to provide an equivalent for the calcium cations in Sample A plus about 0.0 equivalent per equivalent of the sulfate groups in the polysaccharide. At the 0.6 gram level the amount in excess of the equivalent for the calcium cations in the polysaccharide was 0.7 equivalent per equivalent of the sulfate groups in the polysaccharide. In the case of the polysaccharide of Sample G the amount in excess of the equivalent of the calcium content of the polysaccharide, as expressed in terms of equivalent per equivalent of the sulfate groups in the polysaccharide, was about 0.1 at the 0.3 gram level and about 0.9 at the 0.6 gram level.

Calcium sulfate dihydrate was employed at the level of 0.4 gram in combination with sequestrant at the 0.3 gram level. In the case of Sample A, when employing these levels the excess of calcium cations over the equivalent of the sequestrant was 1.5 equivalents per equivalent of the sulfate groups of the polysaccharide. The calcium sulfate dihydrate also was employed at levels of 0.6 and 0.8 gram in combination with sequestrant at the 0.6 gram level and in the case of Sample A the excess of calcium cations was 1.4 and 2.1 equivalents, respectively, per equivalent of the sulfate groups of the polylsaccharide. The pattern was generally similar in the case of the polysaccharide of Sample G.

It is to be noted that the quantity of sequestrant that can be used may be increased to a quantity that is substantially beyond the minimum requirements therefor and to whatever extent may be regarded as desirable in order to provide a safe margin for insuring the complete solution of the polysaccharide provided, however, that enough, but not too much, calcium also is present to insure the gel-forming reaction with the polysaccharide after the sequestrant has become exhausted.

The results using the compositions of Example 2 are shown in Table II.

TABLE II
[Comparison of viscosity and suspending properties of suspensions prepared with various amounts of trisodium phosphate dodecahydrate and calcium sulfate dihydrate and 1.0 gram of polysaccharides.]

| Additives | Weight additives, grams | Sample A, cps. | Sample G, cps. |
|---|---|---|---|
| $Na_3PO_4 \cdot 12H_2O$ | None | 306 (120)* | 485 (402)*. |
| $CaSO_4 \cdot 2H_2O$ | None | Good (poor)* | Perfect (perfect)*. |
| $Na_3PO_4 \cdot 12H_2O$ | 0.3 | 932 | 1,146. |
| $CaSO_4 \cdot 2H_2O$ | 0.4 | Perfect | Perfect. |
| $Na_3PO_4 \cdot 12H_2O$ | 0.6 | 904 | 1,092. |
| $CaSO_4 \cdot 2H_2O$ | 0.6 | Perfect | Perfect. |
| $Na_3PO_4 \cdot 12H_2O$ | 0.6 | 1,042 | 904. |
| $CaSO_4 \cdot 2H_2O$ | 0.8 | Perfect | Perfect. |

* These samples were made in duplicate, which is the reason we show two figures. They were mixed at higher speed than the other samples because otherwise they would not hydrate enough to suspend.

The data of Table II shows that suspensions made using the composition and method of this invention have much higher viscosities than those made with the polysaccharide alone. Moreover, the suspensions were stable and could be diluted with an equal volume of water without breaking the suspensions whereas this could not be done with the suspensions containing the polysaccharide alone. Another advantageous feature of this invention is that there is no necessity for high speed agitation. Only mild stirring is necessary In fact, on a laboratory scale excellent suspensions are obtainable merely by stirring with a spatula.

Example 3

Suspensions were made using the polysaccharide of Sample A at levels of 1.0 gram and 1.2 grams, namely, at concentrations of about 0.6% and about 0.75%, respectively, without additives, and at a level of 0.5 gram (about 0.31%) in the presence of 0.2 gram of sodium phosphate dodecahydrate and 0.2 gram of sodium sulfate dihydrate. The 0.2 gram of sodium phosphate dodecahydrate supplied the equivalent of the calcium contained in the polysaccharide plus about 0.2 equivalent per equivalent of the sulfate groups in the polysaccharide. The 0.2 gram of calcium sulfate dihydrate plus the calcium from the polysaccharide supplied calcium amounting to the equivalent of the sequestrant plus about 1.2 equivalents per equivalent of the sulfate groups of the polysaccharide.

High shear mixing was required to produce gels prepared in the absence of the additives whereas only mild mixing was required when the additives were present. Viscosity values were obtained in the manner above described. The Helipath reading at 6 r.p.m. also was taken as described hereinabove. The results are shown in Table III.

TABLE III
[Viscosity (cps.) and thixotropic gel structure of suspensions made with with polysaccharide.]

| Formula | Viscosity cylindrical spindle, 60 r.p.m. | Helipath high reading, 6 r.p.m. | Helipath low reading, 6 r.p.m. | Helipath difference |
|---|---|---|---|---|
| 1.0 gram Sample A | 306 | 51.9 | 31.8 | 20.1 |
| 1.2 gram Sample A | 486 | 72.9 | 46.0 | 26.3 |
| 0.5 gram Sample A | 344 | 65.4 | 20.5 | 44.9 |
| 0.2 gram $Na_3PO_4 \cdot 12H_2O$ | | | | |
| 0.2 gram $CaSO_4 \cdot 2H_2O$ | | | | |

The data appearing in Table III shows that in the presence of the combined additives about half the amount of polysaccharide mixed with only mild agitation resulted in a viscosity value that was higher than that obtained using 1.0 gram of polysaccharide and not much lower than that obtained in the case of the formula using 1.2 grams of the polysaccharide. The helipath readings in the high range are of similar import and the low readings show that in the presence of the combined additives the gel is more responsive to shear thinning and becomes more thixotropic. At the 1.2 gram level in the absence of the additives the sheer thinning was so slight as to interfere with use of the suspension for grinding or other abrasive uses.

Example 4

This example illustrates the effectiveness of this invention in enabling very good thixotropic gels to be produced regardless of the hardness of the water that may be available for the purpose. In the absence of the combined additives that are employed according to this invention good suspensions cannot be prepared when using hard water. Using the polysaccharide of Sample A, suspensions were prepared with 1.0 gram polysaccharide without additives, and with 1.0 gram polysaccharide and 0.6 gram trisodium phosphate dodecahydrate and 0.6 gram calcium sulfate dihydrate. The suspensions were made in hard water of 240 parts per million hardness (as calcium carbonate) and in soft water (less than 40 p.p.m. hardness). The results are shown in Table IV.

TABLE IV
[Effect of hard waters on suspensions with and without additives. Viscosity—(cps.) and suspending properties.]

| | Sample A | | Sample G | |
|---|---|---|---|---|
| Formula | Soft $H_2O$ | Hard $H_2O$ | Soft $H_2O$ | Hard $H_2O$ |
| 1.0 gram polysaccharide | 120 settled | 43 settled | 420 perfect | 36 settled. |
| Do | 904 | 1,302 | 1,092 | 992. |
| 0.6 gram $Na_3PO_4 \cdot 12H_2O$ | Perfect | Perfect | Perfect | Perfect. |
| 0.6 gram $CaSO_4 \cdot 2H_2O$ | | | | | of the dissolved polysaccharide with resultant gel formation. While it would be possible to induce the liberation of additional calcium in the free dissolved condition by sufficiently severe or prolonged agitation to break up any insoluble calcium compounds on the surface of particles of calcium sulfate dihydrate and thereby permit additional calcium sulfate dihydrate to become dissolved, it is preferable to employ compositions that are in such relative proportions containing a lesser quantity of the phosphate sequestrant with resultant decreased tendency to form any tricalcium phosphate. As aforesaid, the amount of calcium that should be present is the amount of water-soluble calcium compound that is soluble in water with attendant release of calcium cations.

With further reference to Tables V and VI, the preferred relative proportions are those that run diagonally down across each of the tables. These formulations illustrate the scope of the zone of preferred formulation and that the total quantities of sequestrant and of soluble calcium compound can continue to be increased provided the relationship between them is maintained as herein defined and described.

When there is a slight excess of calcium, gel formation and the resulting suspensions are particularly good. Moreover, the formation of the gel is rapid, usually requiring less than 10 minutes. When there is a slight excess of the phosphate, gel formation and the resulting suspensions likewise are good, but the gel formation is slower, usually requiring more than 10 minutes to come to a peak. If the relative amount of phosphate is further increased, gel formation may require 2 to 24 hours before reaching the peak. It is one of the advantageous features of this invention that by selecting the relative proportions of the sequestrant and of the calcium compound the gelling time may be varied and controlled as desired.

The comparative data in Tables V and VI also illustrate the effect of the calcium cations contributed to the system by the polysaccharide. The polysaccharide of Sample A (Table V) contained 5.81% of calcium whereas the polysaccharide of Sample G (Table VI) contained 4.77% calcium. This difference results in a difference in viscosity at the lower phosphate levels. The polysaccharide of Sample A which contained the greater amount of calcium was less soluble and required more phosphate to get it into solution. However, within the zone of optimum relative levels for the sequestrant and for the calcium compound, the resulting viscosities of the gel were about the same. At high phosphate levels the effect of the difference in the calcium content in the two polysaccharides again becomes apparent in that Sample G, which contained less calcium than Sample A, took a little longer to gel.

Example 8

The polysaccharide employed contained about 0.8 equivalent of the calcium per equivalent of sulfate groups, this polysaccharide being referred to as Sample H. The polysaccharide was divided into four portions. Portion 1 was left in its original state. Portion 2 was converted substantially entirely to the sodium salt by ion exchange. Portion 3 was converted substantially entirely to the potassium salt by ion exchange. Portion 4 was converted so as to be substantially entirely in the calcium salt form. A series of 5% dispersions was made with each of these portions. Varying amounts of calcium chloride, ranging from zero to 6 equivalents of calcium per equivalent of sulfate groups, were added to the dispersions of each series and the dispersions were heated to 85° C. The resulting dispersions were stirred for 1 minute and the viscosity in centipoises measured with a Brookfield LVT viscosimeter at 60 r.p.m. Viscosities were plotted logarithmically as shown in the accompanying drawing as a function of total calcium equivalents in the system per equivalent of sulfate groups of the polysaccharide.

As demonstrated in said drawing, the viscosity is related to the total amount of calcium in the system irrespective of whether the calcium becomes included in the system as part of the polysaccharide or as calcium chloride. In the absence of calcium there was no gel and the viscosity was only 20 centipoises. With increasing amounts of calcium the gel structure becomes visible and the viscosity rises to 1300 centipoises at about 1.5 equivalents of calcium per sulfate group. Further increases in calcium gradually reduce the viscosity. Calcium levels below 0.3 equivalent per sulfate group produce systems which are too weak to give a good dispersion. Levels between 0.3 to 4.0 equivalents of calcium ions per sulfate group give excellent thixotropic gels. The optimum level is between 1 and 2 equivalents of calcium per equivalent of sulfate groups. Above 4.0 equivalents of calcium ions per sulfate group the calcium ions interfere with the hydration of the polysaccharide.

We claim:

1. A composition which upon its dissolution in water with the polysaccharide component thereof at a concentration of from about 0.05% to about 4.0% forms a thixotropic gel which when in repose has the consistency of a weak gel that resists flow, which when subjected to mechanical shear that exceeds the yield value of the gel becomes of a thin, flowable consistency, and which upon discontinuance of such mechanical shear assumes said consistency of a weak gel that resists flow, said composition consisting essentially of in solid particulate form (1) a polysaccharide extracted from a marine plant which is composed essentially of glycosidically linked hexose sugar units in the form of D-galactose and 3,6-anhydro-D-galactose residues, which contains sulfate groups whose average number ranges from about 75% to about 125% of the number of said hexose units, which has a molecular weight of from about 20,000 to about 1,000,000 and which exhibits in the infrared spectrum thereof a strong absorption peak at 805–810 reciprocal centimeters in addition to a strong absorption peak at 845–850 reciprocal centimeters, the ratio of the absorption peak at 805–810 reciprocal centimeters to the absorption peak at 845–850 reciprocal centimeters being from 0.4 to 1.0, (2) a water-soluble compound of an alkali metal selected from the group consisting of sodium and potassium which is a sequestrant for calcium, and (3) a water-soluble compound of calcium, said calcium compound being soluble in water with attendant release of calcium cations at a substantially slower rate than that at which said sequestrant dissolves and being present in an amount such that the sum of the calcium from said calcium compound plus calcium in the polysaccharide is the stoichiometric equivalent of said sequestrant plus 0.3 to 4 equivalents per equivalent of sulfate groups contained in the polysaccharide, and said sequestrant being present in an amount that is at least the stoichiometric equivalent of any calcium contained in said polysaccharide.

2. A composition according to claim 1 wherein the amount of said sequestrant is at least the stoichiometric equivalent of any calcium contained in said polysaccharide plus about 0.2 equivalent per equivalent of sulfate groups contained in the polysaccharide; and wherein the ratio of the absorption peak at 805–810 reciprocal centimeters relative to the absorption peak at 845–850 reciprocal centimeters ranges from 0.5 to 0.9.

3. A composition according to claim 1 wherein upon the addition of said composition to water the rate of solution of said calcium compound is not more than about one-half the rate of solution of said sequestrant.

4. A composition according to claim 1 which includes a water-dispersible substance adapted to become dispersed in an aqueous thixotropic gel formed by dissolving said composition in water.

5. A composition according to claim 4 wherein said water-dispersible substance is in the form of a finely particulate solid.

6. A composition according to claim 1 wherein said sequestrant is selected from the group consisting of trisodium phosphate dodecahydrate, sodium hexametaphosphate, sodium carbonate, sodium bicarbonate and the corresponding potassium compounds and said calcium compound is selected from the group consisting of calcium sulfate dihydrate, calcium borate, meta $Ca(BO_2)_2 \cdot 2H_2O$, and tetra $CaB_4O_7 \cdot 6H_2O$.

7. A method of producing a thixotropic gel which comprises adding to water at a concentration of about 0.05% to about 4.0% a polysaccharide that is obtained by extraction from a marine plant and that is composed essentially of glycosidically linked units in the form a D-galactose and 3,6-anhydro-D-galactose residues, that contains sulfate groups whose number ranges from about 75% to about 125% of the number of said hexose units, that exhibits in the infrared spectrum thereof a strong absorption peak at 805–810 reciprocal centimeters in addition to a strong peak at 845–850 reciprocal centimeters, the ratio of the absorption peak at 805–810 reciprocal centimeters to the absorption peak at 845–850 reciprocal centimeters being from 0.4 to 1.0, which has a molecular weight of from about 20,000 to about 1,000,000 and that is water-soluble in the presence of cations selected from the group consisting of sodium and potassium, adding to said water a compound of calcium which gradually releases calcium cations when dispersed in water, including in said water a dissolved sequestrant compound of an alkali metal selected from the group consisting of sodium and potassium that is a sequestrant for calcium, the amount of said sequestrant being effective to render said polysaccharide water-soluble until said polysaccharide becomes completely dissolved by sequestering any calcium contained in said polysaccharide, subjecting the water containing said substances to agitation for maintaining said substances distributed in said water until said polysaccharide is completely dissolved and until said sequestrant is exhausted by calcium cations released from said calcium compound and while continuing said agitation dissolving an additional quantity of said calcium compound for the release of calcium cations therefrom until the total calcium released from said compound is the equivalent of said sequestrant plus 0.3 to 4 equivalents per equivalent of the sulfate groups of said polysaccharide thereby insolubilizing said polysaccharide in the form of a thixotropic gel that when in repose has the consistency of a weak gel that resists flow, that becomes of a thin flowable consistency when the yield value of the gelatinous solid is exceeded under mechanical shear, and that upon discontinuance of such mechanical shear assumes said consistency of a weak gel that resists flow.

8. A method according to claim 7 wherein the polysaccharide is added to the water in an amount which when insolubilized forms a gel containing from about 0.3% to about 1.0% of the polysaccharide.

9. A method according to claim 7 wherein another susbtance is dispersed, in suspended condition, in the thixotropic gel that is formed.

10. A thixotropic gel produced by the method of claim 8.

11. A suspension produced by the method of claim 9.

References Cited
UNITED STATES PATENTS

| | | | |
|---|---|---|---|
| 2,420,308 | 5/1947 | Gates | 252—316 |
| 3,431,211 | 11/1947 | Vallandigham | 252—316X |
| 3,342,612 | 9/1967 | Foster et al. | 260—209X |

OTHER REFERENCES

Rose et al.: The Condensed Chemical Dictionary, Sixth Edition, Reinhold Publishing Corp., New York, 1964, p. 37.

Rose et al.: The Condensed Chemical Dictionary, Seventh Edition, Reinhold Publishing Corp., New York, p. 774.

RICHARD D. LOVERING, Primary Examiner

U.S. Cl. X.R.

51—302; 71—3; 99—25; 106—311; 260—209

UNITED STATES PATENT OFFICE
CERTIFICATE OF CORRECTION

Patent No. 3,562,176     Dated Feb. 9, 1971

Inventor(s) Dimitri J. Stancioff, Richard G. Cash & John Ble

It is certified that error appears in the above-identified patent and that said Letters Patent are hereby corrected as shown below:

Col. 1, line 60, delete "cinpal" and insert --cipal--.

Col. 5, line 37, delete "about 1/2 to about 1/50 the rate sol solution of" and insert in lieu thereof --solution is approximately 1/10th the rate at which--

Col. 6, line 56, delete "suspended" and insert --suspending--.

Col. 7, line 15, after "form" delete "of".

Col. 10, first line under --TABLE IV--, delete "waters" and insert --water--.

Col. 16, second reference "3,431,211" should be --2,431,211--;

under "Other References", line 34, after "New York," insert --1966--.

Signed and sealed this 6th day of July 1971.

(SEAL)
Attest:

EDWARD M. FLETCHER, JR.
Attesting Officer

WILLIAM E. SCHUYLER,
Commissioner of Pate